May 16, 1972
H. LEUCK ET AL  3,663,611
PROCESS FOR CONDUCTING EXOTHERMIC CHEMICAL REACTIONS
IN HETEROGENEOUS GAS-LIQUID MIXTURES
Filed Aug. 29, 1969
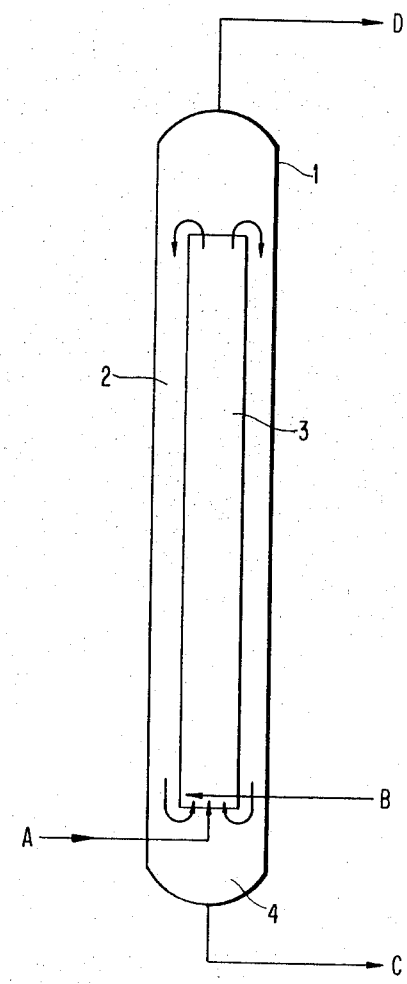
INVENTORS
HANS LEUCK
ERICH KRATZ
BY
ATTORNEYS United States Patent Office
3,663,611
Patented May 16, 1972

3,663,611
PROCESS FOR CONDUCTING EXOTHERMIC CHEMICAL REACTION IN HETEROGENEOUS GAS-LIQUID MIXTURES
Hans Leuck, Troisdorf, and Erich Kratz, Porz-Zundorf, Germany, assignors to Dynamit Nobel AG, Troisdorf, Germany
Filed Aug. 29, 1969, Ser. No. 854,223
Claims priority, application Germany, Aug. 29, 1968, P 17 92 402.6
Int. Cl. C07c 63/02
U.S. Cl. 260—524 R    9 Claims

ABSTRACT OF THE DISCLOSURE

Exothermic chemical reactions in heterogeneous gas-liquid mixtures are carried out by conducting the reaction in a reaction column containing a cooling means and which is in communication with a corresponding parallel-arranged reflux column of the same length, the gaseous reactant being introduced into the reaction column at a unit charge of 0.3 to 0.6 Nm.$^3$ of gas per square meter of reactor cross-section per second and wherein about 60–80% of the gas is introduced into the reaction column and the remainder into the reflux column. The process is especially advantageous for oxidizing a mixture of p-xylene and methyl p-toluate during the production of dimethyl terephthalate.

BACKGROUND OF THE INVENTION

This invention relates to a process for conducting exothermic chemical reactions in heterogeneous gas-liquid mixtures. More particularly, the invention is applicable to an improved process for the oxidation of a mixture of p-xylene and the methyl ester of p-toluic acid by means of oxygen or oxygen-containing gases in the production of dimethyl terephthalate.

Although the invention is described hereinafter with reference to the specific example mentioned above, it is to be understood that the chemical laws thereof can also be applied to other processes involving exothermic reactions in the gas-liquid phase wherein such laws are of importance.

It is conventional in the art to produce dimethyl terephthalate by oxidizing p-xylene with air in the liquid phase. In this process, a methyl group of p-xylene is first oxidized in the presence of a heavy metal catalyst, particularly the cobalt salts of organic acids, with the formation of p-toluic acid. The latter is then esterified with methanol to obtain methyl p-toluate, and this compound is thereafter further oxidized to the monomethyl ester of terephthalic acid and is converted into dimethyl terephthalate by means of methanol. As a practical matter in conducting a process of this type, mixtures of p-xylene and methyl p-toluate are oxidized and esterified together, and the thus-produced dimethyl terephthalate is separated from the reaction mixture. The methyl toluate is then recycled to the mixture and again subjected to the air oxidation step with fresh xylene.

On an industrial scale, this process is carried out in batches or continuously at a pressure of about 7 to 11 atmospheres absolute and at temperatures of approximately 140° to 160° C. Moreover, it is desirable to obtain high substance and space-time yields with an oxygen conversion which is as quantitative as possible, while simultaneously removing the considerable heat of reaction with a constant temperature that is ambient in the oxidation zone. In order to meet these requirements, attempts have been made to conduct the oxidation, on the one hand, and the removal of the heat of reaction, on the other hand, in separate devices or apparatuses, wherein the heat is removed from the product by lowering the temperature in coolers provided externally of the oxidizing vessel. The disadvantages of this process reside mainly in that even at high flow rates of the oxidized product, heavy incrustations occur in the cooling system, and, moreover, temperature variations which unfavorably influence the further progress of the reaction are unavoidable in the reaction chamber.

It is also conventional to conduct the oxidation process and the removal of the heat of reaction in one and the same apparatus. In this case, a cooling system is arranged within the oxidation vessel, operated by means of the evaporating vessel feed water. The heat of reaction of the oxidation is utilized for the generation of steam in this procedure. However, such cooling systems also gradually become ineffective because of the deposition of poorly soluble and unmeltable products, such as, for example, the cobalt salts of terephthalic acid. Accordingly, in order to maintain the efficiency of the system, cumbersome cleaning operations are necessary at periodic intervals requiring either expensive stand-by units or a shutdown of the operation and, thus, an ensuing loss of production.

Furthermore, attempts have been made to remove the heat of reaction of the oxidation stage by evaporative cooling which involves evaporating a part of the volatile components from the oxidation product, condensing this part, and recycling the same to the reactor. This process exhibits the disadvantage that temperature differences of approximately 10° C. occur in the reaction zone because of the hydrostatic pressure difference in the oxidation column. However, experience gained in practice has shown that the oxidation of mixtures of xylene and methyl toluate at temperatures of 140–145° C. takes place with especially satisfactory yields of toluic acid and monomethyl terephthalate. At temperatures ranging even only sporadically above the aforementioned values, losses in yield occur because of the formation of carbon dioxide, lower aliphatic acids and high molecular weight oxidation products.

SUMMARY OF THE INVENTION

Accordingly, one of the objects of the present invention is to provide an improved process for conducting exothermic chemical reactions in heterogeneous gas-liquid mixtures which overcomes the disadvantages and deficiencies of the prior art methods.

Another object of the present invention is to provide a process for oxidizing a mixture of p-xylene and the methyl ester of p-toluic acid, particularly in the production of dimethyl terephthalate.

A further object of the invention is to provide a process for conducting exothermic chemical reactions of the type described which make it possible to obtain the product of reaction in high yield and efficiently on an industrial scale.

These and other objects and advantages of the present invention will become apparent to those skilled in the art from a consideration of the following specification and claims and of the attached drawing wherein:

The figure shows a schematic illustration of a reactor which may be used in connection with the invention.

The present invention provides a novel way to effectively counter the difficulties of the previously known processes. The invention is based on the fact that the flow conditions in a chemical reactor not only influence the reaction as such, but also its speed and the yields obtained, and also simultaneously the transport of heat and the specific volume efficiency, either directly or indirectly. For, in accordance with the invention, it becomes possible to control, in reactions in heterogeneous gas-liquid systems, the type and effect of the occurring two-phase flow with the aid of the gaseous reactant in such a manner that with a uniform temperature and concentration distribution in the reactor the desired conversion and heat transfer values are increased, while simultaneously the deposition of solids on the heat exchange surfaces of the oxidation reactor is avoided.

In accordance with the present invention, it has been found that the above objectives can be met if the liquid reaction mixture is allowed to react in at least one preferably elongated oxidation column containing the cooling system, which column is in communication with at least one parallel-disposed reflux (backflow) column, using a unit charge of reaction gas in the oxidation column of 0.3–0.6 Nm.$^3$ of gas per m.$^2$ and second. In this connection, 60–80% of this gas is directly introduced into the oxidation column in order to produce circulation of the liquid, and the remainder is charged into the reflux column to regulate the circulation rate. Particularly preferred is a specific load or unit charge of the oxidation column of 0.4 Nm.$^3$ of gas per m.$^2$ per second. As is known in the art, the expression "Nm.$^3$" means that the volumetric quantity is measured at 0° C. and 1 atmosphere absolute. By conducting the process in this manner, the flow conditions in the oxidation reactor can be extensively adapted to the special requirements of the desired chemical conversion, heat transport and reaction rate of the oxidation reaction.

As noted above, the process of the invention is particularly advantageous for the oxidation of a mixture of p-xylene and methyl p-toluate by means of oxygen or oxygen-containing gases in the production of dimethyl terephthalate in the presence of heavy metal-containing oxidation catalysts. Experience has shown that the xylene oxidation, in particular, requires a uniform temperature and concentration distribution in the reaction system and that a thorough turbulence of the flow in the reactor is required in order to obtain high heat transfer and mass transfer values and in order to avoid incrustations. In other words, as intense a circulation as is possible is desired. However, the more quickly that the contents of the reactor are circulated, the shorter is the contact time between the gaseous and liquid phase with the result that the residence time of the liquid reactants becomes less uniform with an increasing ratio of circulated quantity to passed-through quantity.

It is with respect to this latter point that the invention provides a novel way of obtaining advantageous heat transfer and mass transfer relationships while avoiding disadvantageous deposits of solids with the aid of a high specific cross-sectional gas load on the cooler-equipped oxidation column, the latter for this purpose being substantially narrowed. Moreover, by regulating the circulation value by means of the introduction of air into the reflux column, an optimum residence time of the two phases is attained with a constantly high specific volume efficiency.

The process of the invention and the favorable results obtained thereby are further explained below in connection with the reactor which is schematically illustrated in the attached drawing.

The liquid starting material is introduced at A into the reactor, comprising the oxidation column 1 with the cooling system, the latter not being shown in the drawing, and the reflux column 2. The inlet for starting material is disposed in the lower portion of the column 1 where, at B, the larger portion of the oxygen or oxygen-containing gas is also charged into the reactor. Then, the reaction mixture flows, together with the gas, upwardly in the oxidation column to the degasifying chamber 3 where the liquid C is separated from the gaseous phase D leaving the reactor. Then, the liquid flows over into the reflux column and can be withdrawn in the lower portion 4 of the reactor. The circulation rate of the liquid, which adjusts itself on the basis of hydrodynamic laws, is controlled by introducing a part of the oxidation air into the reflux column.

EXAMPLE OF THE INVENTION

For comparison purposes, two experiments were carried out in an oxidation reactor having a nominal capacity of 40 m.$^3$. The reactor contained a tubular nest system having a heat exchange area of 240 m.$^2$, exhibited a ratio of height to diameter of about 7:1 and was provided in the lower reactor section with a liquid circulation pipe mounted on the outside thereof. The characteristic or "hydraulic diameter" of this reactor was $d_h = 358$ mm., and its effective oxidation height was $H = 31 \times d_h$.

A reaction mixture of p-xylene and methyl p-toluate in a ratio of about 1:1.5 was oxidized with a dissolved cobalt salt as the oxidation catalyst at a pressure of 7 atmospheres absolute and a temperature of 150° C. by means of atmospheric oxygen in this reactor. The specific air load on the free oxidation cross-section was 0.21 Nm.$^3$ per m.$^2$ of reactor cross-section per second. At the beginning of the experiment, i.e., when the nest of tubes was uncontaminated, a temperature difference of 25° C. was determined between the product and the coolant. Later, due to the deposition of oxidation products in the reactor, this temperature difference rose to 40° C., so that the specific air load had to be lowered to 0.16 Nm.$^3$ per m.$^2$ of reactor cross-section per second. Furthermore, it was necessary to remove the deposits of solids from the reactor every three months, during which cleaning time this part of the plant had to be shut down completely. This first experiment represents the prior art procedure.

In contrast thereto, when operating according to the invention in an oxidation reactor having the same nominal volume, the same ratio of height to diameter and the same heat exchange surface area, but being provided, by narrowing the reaction chamber and having a reflux chamber of the same height, with a hydraulic diameter reduced by this narrowing to $d_h = 200$ mm. and an effective oxidation height based thereon of $H = 56 \times d_h$, it was possible to oxidize the same reaction mixture as in the above comparative experiment at a specific and uniform air load of the oxidation column cross-section of 0.4 Nm.$^3$ per m.$^2$ per second, the temperature difference between product and cooling medium being, on the average, 19° C. Thus, the heat transport was quite decisively improved and, accordingly, the reaction temperature could be lowered to 140° C. Moreover, the efficiency and the conversion rate of the reactor remained the same without any cleaning, even after twelve months of operation.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A process for oxidizing a liquid mixture of p-xylene and methyl p-toluate which comprises contacting said liquid mixture with an oxidizing gas selected from the group consisting of oxygen and oxygen-containing gas in at least one oxidation column means containing a cooling means and being in communication with at least one corresponding parallel-arranged reflux column means of the same length, the oxidizing gas being introduced into said oxidation column means at a unit charge of 0.3 to 0.6 Nm.$^3$ of gas per square meter of reactor cross-section per second, and wherein about 60–80% of the gas is introduced into said oxidation column means and the remainder is charged into said reflux column means to control circulation of the liquid mixture therein.

2. The process of claim 1, wherein said oxidation column means comprises at least one elongated tube.

3. The process of claim 1, wherein the specific charge of gas into the oxidation column means is about 0.4

$Nm.^3$ of gas per square meter of reactor cross-section per second.

4. The process of claim 1, wherein said reaction column means has a hydraulic diameter ($d_h$) of about 190 to 210 mm. and an effective reaction height (H) that is 50-60 times greater than the hydraulic diameter thereof.

5. A process for oxidizing a liquid mixture of p-xylene and methyl p-toluate in the presence of a heavy metal-containing catalyst during the production of dimethyl terephthalate which comprises introducing said liquid mixture together with a gas comprising oxygen into at least one oxidation column containing a cooling system and being in communication with at least one corresponding parallel-arranged reflux column of the same length, said gas being introduced into said oxidation column at a unit charge of 0.3 to 0.6 $Nm.^3$ of gas per square meter of reactor cross-section per second with about 60-80% of the gas being introduced into said oxidation column and the remainder being charged into said reflux column whereby the circulation of said liquid mixture through said reflux column is controlled to optimize the residence time of the liquid and gas phases.

6. The process of claim 5, wherein said oxidation column means comprises at least one elongated tube.

7. The process of claim 5, wherein the specific charge of gas into the oxidation column is about 0.4 $Nm.^3$ of gas per square meter of reactor cross-section per second.

8. The process of claim 5, wherein said oxidation column has a hydraulic diameter ($d_h$) of about 190 to 210 mm. and an effective reaction height (H) that is 50-60 times greater than the hydraulic diameter thereof.

9. The process of claim 8, wherein the oxidation is carried out at a temperature of about 140° C. to 145° C.

References Cited
UNITED STATES PATENTS

| | | | |
|---|---|---|---|
| 3,313,849 | 4/1967 | List et al. | 23—288 |
| 2,894,978 | 7/1959 | Katzschmann | 260—524 |

LORRAINE A. WEINBERGER, Primary Examiner

R. S. WEISSBERG, Assistant Examiner

U.S. Cl. X.R.

23—283, 288 E